United States Patent
Mednik et al.

(10) Patent No.: US 9,661,702 B2
(45) Date of Patent: May 23, 2017

(54) CONSTANT-CURRENT CONTROLLER WITH SQUARE-WAVE INPUT CURRENT SHAPING

(71) Applicant: Microchip Technology Incorporated, Chandler, AZ (US)

(72) Inventors: Alexander Mednik, Campbell, CA (US); Rohit Tirumala, Sunnyvale, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 15/051,335

(22) Filed: Feb. 23, 2016

(65) Prior Publication Data
US 2016/0262227 A1    Sep. 8, 2016

Related U.S. Application Data

(60) Provisional application No. 62/128,807, filed on Mar. 5, 2015.

(51) Int. Cl.
*H05B 33/08* (2006.01)

(52) U.S. Cl.
CPC ..... *H05B 33/0815* (2013.01); *H05B 33/0845* (2013.01); *Y02B 20/345* (2013.01)

(58) Field of Classification Search
CPC .......... H05B 33/0815; H05B 33/0845
See application file for complete search history.

(56) References Cited

U.S. PATENT DOCUMENTS

| | | | | |
|---|---|---|---|---|
| 2010/0118572 A1* | 5/2010 | Mednik | .............. | H05B 33/0818 363/90 |
| 2013/0249427 A1* | 9/2013 | Jin | ..................... | H05B 33/0815 315/205 |
| 2014/0217911 A1* | 8/2014 | Mednik | .............. | H05B 33/0815 315/209 R |
| 2015/0022168 A1* | 1/2015 | Mednik | ................. | H02M 3/155 323/282 |

* cited by examiner

*Primary Examiner* — Jany Richardson
(74) *Attorney, Agent, or Firm* — Burr & Forman LLP; Ryan M. Corbett

(57) ABSTRACT

A constant-current controller with square wave input current shaping for driving a series of light emitting diodes (LEDs) is provided. The controller may include a sample and hold circuit that samples a current sense voltage, a first multiplier circuit that multiplies an output of the sample and hold circuit, an error detector circuit that compares an output of the multiplier circuit with a reference voltage, an error amplifier that amplifies an output of the error detector circuit, a second multiplier circuit that multiplies an output of the error amplifier by a coefficient, and an output circuit that outputs a pulse-width modulated control signal based on an output of the second multiplier circuit. The coefficient may vary depending on whether the constant-current LED driver controller is used with a boost converter or a buck-boost converter.

21 Claims, 4 Drawing Sheets

CONSTANT-CURRENT CONTROLLER WITH SQUARE-WAVE INPUT CURRENT SHAPING

CROSS REFERENCE TO RELATED APPLICATION

This application claims the benefit of U.S. Provisional Patent Application No. 62/128,807, filed on Mar. 5, 2015, which is incorporated herein by reference in its entirety.

TECHNICAL FIELD

The exemplary embodiments disclosed herein generally relate to a dimmable LED driver controller. According to an aspect of one or more exemplary embodiments, the controller may use a single current sense input for accurate regulation of the LED current and for optimal input current shaping. One or more exemplary embodiments may achieve one or more of the following: maintain a rectangular input current wave shape, accurate full-angle output current, improved line and load regulation, and support boost or buck-boost topology.

SUMMARY

According to an aspect of one or more exemplary embodiments there is provided a constant-current LED driver controller that may include a sample and hold circuit that samples a current sense voltage, a first multiplier circuit that multiplies an output of the sample and hold circuit, an error detector circuit that compares an output of the multiplier circuit with a reference voltage, an error amplifier that amplifies an output of the error detector circuit, a second multiplier circuit that multiplies an output of the error amplifier by a coefficient, and an output circuit that outputs a pulse-width modulated control signal based on an output of the second multiplier circuit.

The driver controller may also include an integrator circuit that outputs a ramp signal based on the current sense voltage, and a comparator that receives the output of the second multiplier circuit and the ramp signal, and generates a reset signal that is input to the output circuit.

The coefficient may vary depending on whether the constant-current LED driver controller is used with a boost converter or a buck-boost converter.

The coefficient may be equal to the pulse-width modulated control signal if the constant-current LED driver controller is used with a boost converter.

The coefficient may be equal to one if the constant-current LED driver controller is used with a buck-boost converter.

The sample and hold circuit may sample the current sense voltage at a mid-point of an interval of the pulse-width modulated control signal.

The first multiplier circuit may multiply the output of the sample and hold circuit by the difference between one and the pulse-width modulated control signal.

The error detector circuit may compare the output of the first multiplier circuit with a reference voltage.

The controller may also include a topology detector circuit that generates the coefficient. The topology detector circuit may include a comparator that compares the current sense voltage a threshold voltage, and generates an output based on the comparison, a first logic gate that receives the output of the comparator and the pulse-width modulated control signal as inputs, and a second logic gate that receives an output of the first logic gate and the pulse-width modulated control signal as inputs, and generates the coefficient as an output.

The controller may also include a third multiplier that multiplies a reference voltage and a dimming coefficient to generate a product that is input to the error detector circuit.

The error detector circuit may compare the product generated by the third multiplier and the output of the first multiplier.

The dimming coefficient may be a function of a phase-cut dimming angle of a voltage source.

According to one or more exemplary embodiments, there is provided a boost-type switching power converter that includes a rectified voltage source, an inductor coupled to the rectified voltage source, a rectifier diode coupled to the inductor, a smoothing capacitor coupled to the rectifier diode, one or more light emitting diodes (LEDs) connected in parallel with the smoothing capacitor, a controlled power switch coupled to the rectifier diode and in parallel with the smoothing capacitor, a current sense resistor coupled to the controlled power switch, and an LED driver controller coupled to the controlled power switch and the current sense resistor. The LED driver controller may output a pulse-width modulated control signal to the controlled power switch. The current sense resistor may develop a current sense voltage representing a current in the inductor. An average magnitude of the current in the inductor may be equal to an input current provided by the rectified voltage source.

According to one or more exemplary embodiments, there is provided a buck-boost-type switching power converter that includes a rectified voltage source, an inductor coupled to the rectified voltage source, a rectifier diode coupled to the inductor, a smoothing capacitor coupled to the rectifier diode and the inductor, one or more light emitting diodes (LEDs) connected in parallel with the smoothing capacitor, a controlled power switch coupled to the rectifier diode and the inductor, a current sense resistor coupled to the controlled power switch, and an LED driver controller coupled to the controlled power switch and the current sense resistor. The LED driver controller may output a pulse-width modulated control signal to the controlled power switch. The current sense resistor develops a current sense voltage representing at least a portion of a current in the inductor. An average magnitude of the current in the inductor equals an input current provided by the rectified voltage source.

DETAILED DESCRIPTION OF EXEMPLARY EMBODIMENTS

Figure 1:
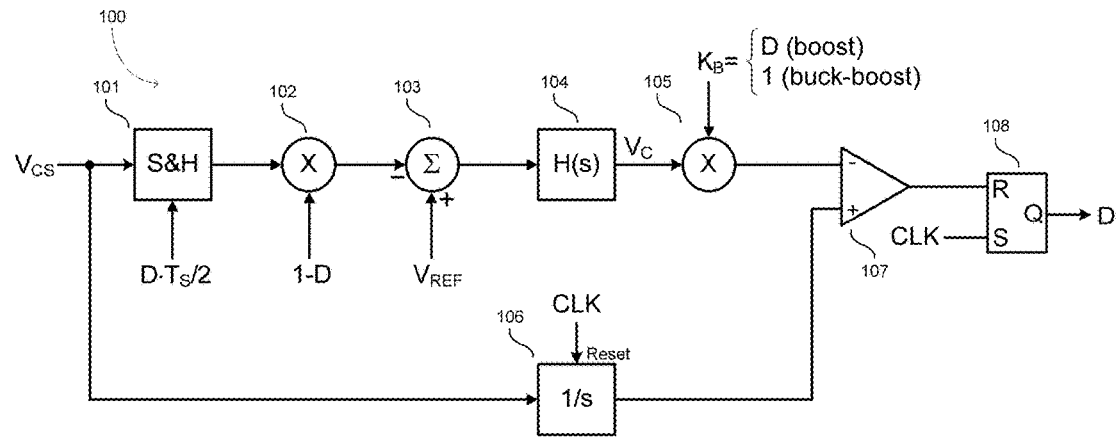
FIG. 1 is a circuit diagram of a constant-current LED driver controller according to an exemplary embodiment.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

According to an aspect of one or more exemplary embodiments, the controller may use a single current sense input for accurate regulation of the LED current and for optimal input current shaping. One or more exemplary embodiments may achieve one or more of the following: maintain a rectangular input current wave shape, accurate full-angle output current, improved line and load regulation, support boost or buck-boost topology.

FIG. 1 depicts an exemplary embodiment of a constant-current LED driver controller 100 that receives a current sense voltage $V_{CS}$ and generates a pulse-width modulated signal D for regulating constant LED current and for square-wave shaping of input current of a switching power converter operating with a switching period $T_S$.

Referring to FIG. 1, the constant-current LED driver controller 100 may include a sample-and-hold (S&H) circuit 101 for sampling the current sense voltage $V_{CS}$ every switching cycle $T_S$ at the mid-point of the interval of pulse-width modulated signal D; a multiplier circuit 102 for receiving the output of the S&H circuit 101 and multiplying it by (1-D); an error detector 103 for comparing the output of the multiplier 102 with a reference voltage $V_{REF}$ and for generating a difference error signal; an error amplifier 104 with frequency compensation; a multiplier 105 for multiplying the output of the error amplifier 104 by a coefficient $K_B$. In the case where the switching power converter 400 is of a boost type, the coefficient $K_B$ is equal to duty ratio of D. In the case where the switching power converter 300 is of a buck-boost type, the coefficient $K_B$ is equal to 1.

The constant-current LED driver controller 100 according to the exemplary embodiment of FIG. 1 may also include an integrator circuit 106 for receiving current sense voltage $V_{CS}$ and generating a ramp signal in proportion to the current sense voltage $V_{CS}$. The integrator circuit also may receive a clock signal CLK as a reset input. The constant-current LED driver controller 100 according to the exemplary embodiment of FIG. 1 may also include a comparator 107 for receiving the output of the multiplier 105 and the output of the integrator 106, and for generating a reset signal. The constant-current LED driver controller 100 may also include a PWM flip-flop circuit 108 for initiating the PWM interval D upon receiving the clock signal CLK, and for terminating the PWM interval D upon receiving the reset signal from the comparator 107.

Figure 2:
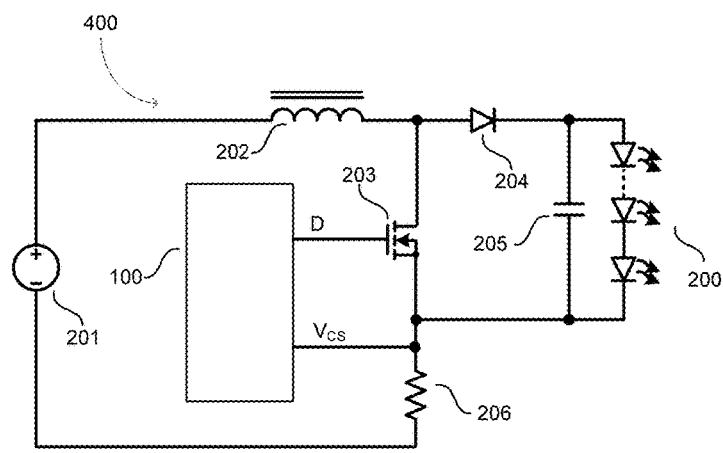
FIG. 2 is a circuit diagram of a switching power converter according to an exemplary embodiment.

FIG. 2 depicts a switching power converter 400 of a boost type according to an exemplary embodiment. Referring to FIG. 2, the switching power converter 400 drives an LED string 200 at a regulated average current, and may include a rectified AC voltage source 201, an inductor 202, a controlled power switch 203, a rectifier diode 204, a smoothing capacitor 205, and a current sense resistor 206. The controlled power switch 203 receives its PWM control signal D from the controller 100 depicted in FIG. 1. The current sense resistor 206 develops the current sense voltage $V_{CS}$ representing the inductor 202 current, whose average magnitude equals the input current received by the power converter 400 from the voltage source 201.

Figure 3:
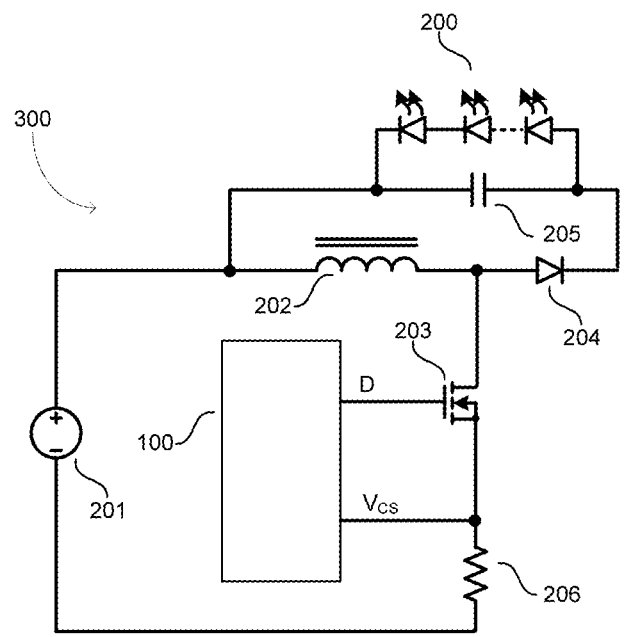
FIG. 3 is a circuit diagram of a switching power converter according to another exemplary embodiment.

FIG. 3 depicts a switching power converter 300 of a buck-boost type according to an exemplary embodiment. Referring to FIG. 3, the switching power converter 300 drives an LED string 200 at a regulated average current, and may include a rectified AC voltage source 201, an inductor 202, a controlled power switch 203, a rectifier diode 204, a smoothing capacitor 205, and a current sense resistor 206. The controlled power switch 203 receives its PWM control signal D from the controller 100 depicted in FIG. 1. The resistor 206 develops the current sense voltage $V_{CS}$ representing a portion of the inductor 202 current, whose average magnitude equals the input current received by the power converter 300 from the voltage source 201.

Figure 4:
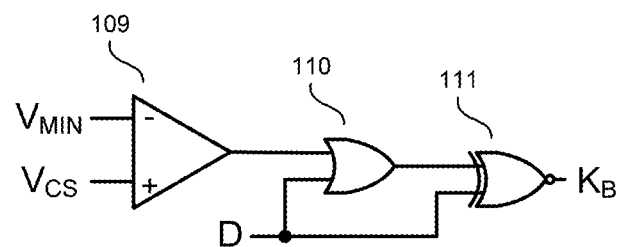
FIG. 4 is a circuit diagram of a topology detector circuit according to an exemplary embodiment.

FIG. 4 depicts a topology detector circuit according to an exemplary embodiment for generating the coefficient $K_B$. The topology detector circuit may include a comparator 109 for comparing the current sense voltage $V_{CS}$ with a threshold level $V_{MIN}$, logic gates 110 and 111 for generating a coefficient $K_B$ equal to 1 when the output of the comparator 109 equals D, and for generating a coefficient $K_B$ equal to D when the output of the comparator 109 equals 1. Logic gate 110 may be an OR gate, while logic gate 111 may be an XNOR gate.

Figure 5:
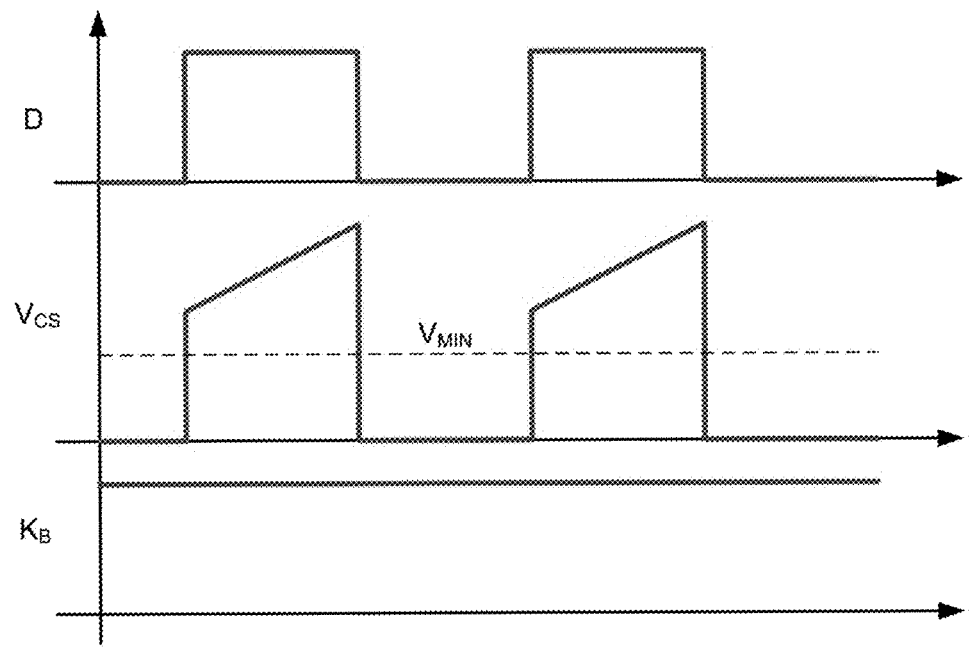
FIG. 5 is a timing diagram illustrating the operation of the topology detector of FIG. 4 when used with the switching power converter of FIG. 3 according to an exemplary embodiment.

FIG. 5 illustrates operation of the topology detector of FIG. 4 for the case of the buck-boost power converter 300 of FIG. 3. Referring to FIG. 5, when operating in a buck-boost configuration, the current sense voltage $V_{CS}$ is a periodic signal that repeatedly rises above and falls below a threshold level $V_{MIN}$. The PWM control signal D is a periodic signal that rises and falls with the current sense voltage $V_{CS}$. When the current sense voltage $V_{CS}$ is greater than the threshold level $V_{MIN}$, the output of comparator 109 is logic high, which causes the output of OR gate 110 to also be logic high. At the time current sense voltage $V_{CS}$ is greater than the threshold level $V_{MIN}$, the PWM control signal D is also high, which causes the coefficient $K_B$ output from XNOR gate 111 to be logic high. When the current sense voltage $V_{CS}$ is below the threshold level $V_{MIN}$, the PWM control signal D is also low. This causes the outputs of comparator 109 and OR gate 110 to be logic low. Because PWM control signal D and the output of OR gate 110 are low, the coefficient $K_B$ output from XNOR gate 111 is logic high. Therefore, during the buck-boost operation the coefficient $K_B$ remains equal to one.

Figure 6:
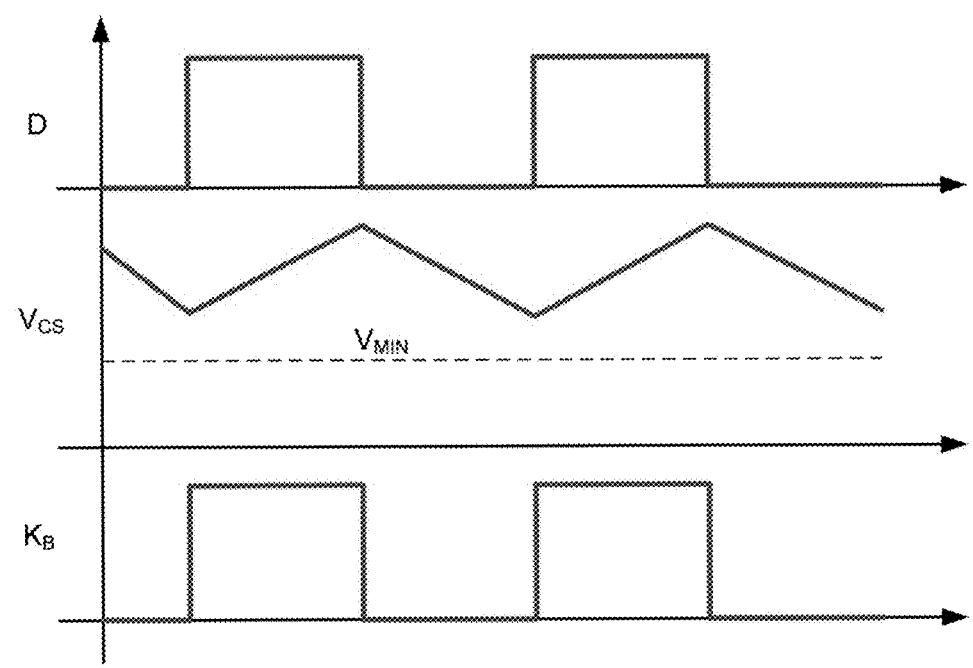
FIG. 6 is a timing diagram illustrating the operation of the topology detector of FIG. 4 when used with the switching power converter of FIG. 2 according to an exemplary embodiment.

FIG. 6 illustrates operation of the topology detector of FIG. 4 for the case of the boost power converter 400 of FIG. 2. Referring to FIG. 6, the current sense voltage $V_{CS}$ is a periodic signal that always remains above the threshold level $V_{MIN}$, which means that the outputs of comparator 109 and OR gate 110 are always logic high. Thus, because one input to the XNOR gate 111 is always high, the coefficient $K_B$ output from XNOR gate 111 will follow the other input into XNOR gate 111, PWM control signal D.

Figure 7:
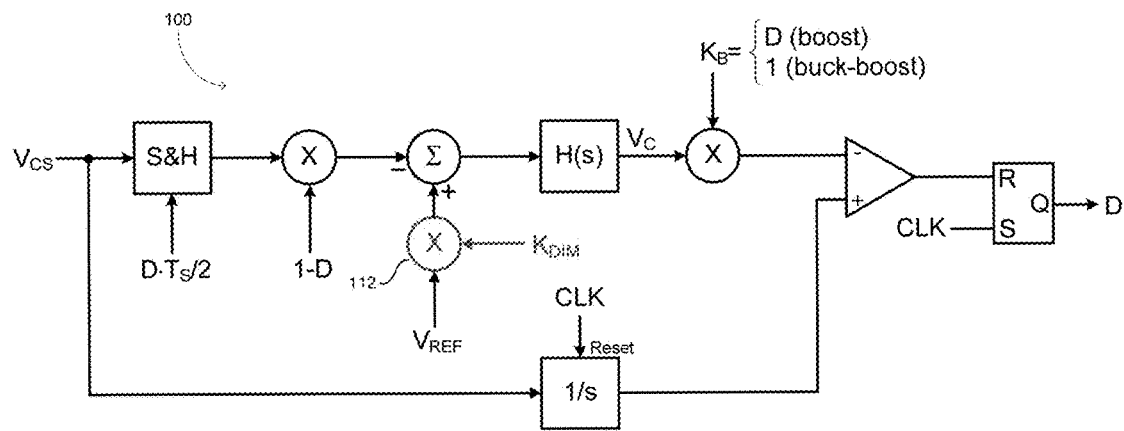
FIG. 7 is a circuit diagram of a constant-current LED driver controller according to another exemplary embodiment.
Figure 8:
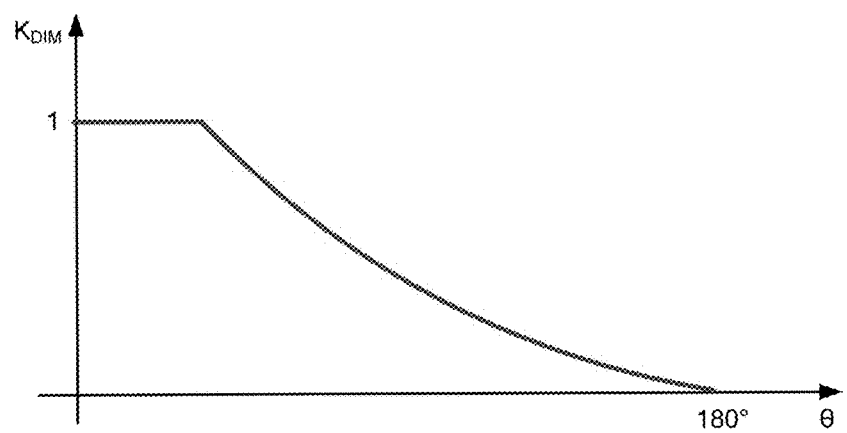
FIG. 8 depicts an exemplary characteristic curve for a dimming coefficient used as an input to the constant-current LED driver controller of FIG. 7.

FIG. 7 depicts a constant-current LED driver controller according to another exemplary embodiment. The constant-current LED driver controller of FIG. 7 is similar to the constant-current LED driver controller 100 of FIG. 1, but also includes a multiplier 112 for modulating $V_{REF}$ in proportion with a dimming coefficient $K_{DIM}$. The coefficient $K_{DIM}$ is generated as a function of phase-cut dimming angle theta of the voltage source 201. An exemplary $K_{DIM}$ characteristic as a function of dimming angle theta is depicted in FIG. 8.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A constant-current LED driver controller comprising:
a sample and hold circuit that samples a current sense voltage;
a first multiplier circuit that multiplies an output of the sample and hold circuit;
an error detector circuit that compares an output of the multiplier circuit with a reference voltage;
an error amplifier that amplifies an output of the error detector circuit; and
an output circuit that outputs a pulse-width modulated control signal based on an output of the error amplifier circuit.

2. The constant-current LED driver controller of claim 1, further comprising:
a second multiplier circuit that multiplies an output of the error multiplier by a topology-dependent coefficient;
wherein the output circuit outputs the pulse-width modulated control signal based on an output of the second multiplier circuit.

3. The constant-current LED driver controller of claim 2, further comprising:
an integrator circuit that outputs a ramp signal based on the current sense voltage; and
a comparator that receives the output of the second multiplier circuit and the ramp signal, and generates a reset signal that is input to the output circuit.

4. The constant-current LED driver controller of claim 2, wherein the topology-dependent coefficient varies depending on whether the constant-current LED driver controller is used with a boost converter or a buck-boost converter.

5. The constant-current LED driver controller of claim 4, wherein the topology-dependent coefficient is equal to the pulse-width modulated control signal if the constant-current LED driver controller is used with a boost converter.

6. The constant-current LED driver controller of claim 4, wherein the topology-dependent coefficient is equal to one if the constant-current LED driver controller is used with a buck-boost converter.

7. The constant-current LED driver controller of claim 1, wherein the sample and hold circuit samples the current sense voltage at a mid-point of an interval of the pulse-width modulated control signal.

8. The constant-current LED driver controller of claim 1, wherein the first multiplier circuit multiplies the output of the sample and hold circuit by the difference between one and a duty ratio of the pulse-width modulated control signal.

9. The constant-current LED driver controller of claim 1, wherein the error detector circuit compares the output of the first multiplier circuit with a reference voltage.

10. The constant-current LED driver controller of claim 1, further comprising a topology detector circuit that generates the topology-dependent coefficient, the topology detector circuit comprising:
a comparator that compares the current sense voltage a threshold voltage, and generates an output based on the comparison;
a first logic gate that receives the output of the comparator and the pulse-width modulated control signal as inputs; and
a second logic gate that receives an output of the first logic gate and the pulse-width modulated control signal as inputs, and generates the coefficient as an output.

11. The constant-current LED driver controller of claim 2, further comprising a third multiplier that multiplies a reference voltage and a dimming coefficient to generate a product that is input to the error detector circuit.

12. The constant-current LED driver controller of claim 11, wherein the error detector circuit compares the product generated by the third multiplier and the output of the first multiplier.

13. The constant-current LED driver controller of claim 10, wherein the dimming coefficient is a function of a phase-cut dimming angle of a voltage source.

14. A boost-type switching power converter comprising:
a rectified voltage source;
an inductor coupled to the rectified voltage source;
a rectifier diode coupled to the inductor;
a smoothing capacitor coupled to the rectifier diode;
one or more light emitting diodes (LEDs) connected in parallel with the smoothing capacitor;
a controlled power switch coupled to the rectifier diode and in parallel with the smoothing capacitor;
a current sense resistor coupled to the controlled power switch; and
an LED driver controller coupled to the controlled power switch and the current sense resistor;
wherein the LED driver controller outputs a pulse-width modulated control signal to the controlled power switch;
wherein the current sense resistor develops a current sense voltage representing a current in the inductor;
wherein an average magnitude of the current in the inductor equals an input current provided by the rectified voltage source; and
wherein the LED driver controller comprises
a sample and hold circuit that samples a current sense voltage;
a first multiplier circuit that multiplies an output of the sample and hold circuit;
an error detector circuit that compares an output of the multiplier circuit with a reference voltage;
an error amplifier that amplifies an output of the error detector circuit; and
an output circuit that outputs the pulse-width modulated control signal based on an output of the error amplifier.

15. The boost-type switching power converter of claim 14, wherein the LED driver controller further comprises:
a second multiplier circuit that multiplies an output of the error amplifier by a topology-dependent coefficient;
wherein the output circuit outputs the pulse-width modulated control signal based on an output of the second multiplier circuit.

16. The boost-type switching power converter of claim 15, wherein the LED driver controller further comprises:
an integrator circuit that outputs a ramp signal based on the current sense voltage; and
a comparator that receives the output of the second multiplier circuit and the ramp signal, and generates a reset signal that is input to the output circuit.

17. The boost-type switching power converter of claim 15, wherein the topology-dependent coefficient is equal to a duty ratio of the pulse-width modulated control signal.

18. A buck-boost-type switching power converter comprising:
a rectified voltage source;

an inductor coupled to the rectified voltage source;
a rectifier diode coupled to the inductor;
a smoothing capacitor coupled to the rectifier diode and the inductor;
one or more light emitting diodes (LEDs) connected in parallel with the smoothing capacitor;
a controlled power switch coupled to the rectifier diode and the inductor;
a current sense resistor coupled to the controlled power switch; and
an LED driver controller coupled to the controlled power switch and the current sense resistor;
wherein the LED driver controller outputs a pulse-width modulated control signal to the controlled power switch;
wherein the current sense resistor develops a current sense voltage representing at least a portion of a current in the inductor;
wherein an average magnitude of the current in the inductor equals an input current provided by the rectified voltage source; and
wherein the LED driver controller comprises:
  a sample and hold circuit that samples a current sense voltage;
  a first multiplier circuit that multiplies an output of the sample and hold circuit;
  an error detector circuit that compares an output of the multiplier circuit with a reference voltage;
  an error amplifier that amplifies an output of the error detector circuit; and
  an output circuit that outputs a pulse-width modulated control signal based on an output of the error amplifier.

19. The buck-boost-type switching power converter of claim 18, wherein the LED driver controller further comprises:
  a second multiplier circuit that multiplies an output of the error amplifier by a topology-dependent coefficient;
  wherein the output circuit outputs the pulse-width modulated control signal based on an output of the second multiplier circuit.

20. The buck-boost-type switching power converter of claim 19 wherein the LED driver controller further comprises:
  an integrator circuit that outputs a ramp signal based on the current sense voltage; and
  a comparator that receives the output of the second multiplier circuit and the ramp signal, and generates a reset signal that is input to the output circuit.

21. The buck-boost-type switching power converter of claim 20, wherein the topology-dependent coefficient is equal to one.

* * * * *